United States Patent
Chen et al.

(10) Patent No.: US 7,869,213 B2
(45) Date of Patent: Jan. 11, 2011

(54) HEAT DISSIPATION DEVICE OF NOTEBOOK COMPUTER

(75) Inventors: Chien-Yuan Chen, Taipei (TW); Ying-Te Chuang, Kaohsiung (TW); Yi-Sheng Chen, Taipei (TW)

(73) Assignee: Power Data Communications Co., Ltd., Taipei County (TW)

( * ) Notice: Subject to any disclaimer, the term of this patent is extended or adjusted under 35 U.S.C. 154(b) by 27 days.

(21) Appl. No.: 12/431,767

(22) Filed: Apr. 29, 2009

(65) Prior Publication Data

US 2009/0279247 A1 Nov. 12, 2009

(30) Foreign Application Priority Data

Nov. 5, 2008 (TW) .............................. 97219783 U

(51) Int. Cl.
*H05K 7/20* (2006.01)

(52) U.S. Cl. ............. 361/695; 361/679.47; 361/679.54; 361/697; 165/80.3; 165/121

(58) Field of Classification Search ................................. 361/679.46–679.49, 679.54, 690–697, 704–712, 361/715, 719; 257/706–727; 165/80.2, 80.3, 165/104.33, 121, 122, 185; 174/17 VA, 15.1, 174/16.3, 252; 454/184
See application file for complete search history.

(56) References Cited

U.S. PATENT DOCUMENTS

| | | | | |
|---|---|---|---|---|
| 5,727,624 A | * | 3/1998 | Ko et al. | 165/121 |
| 6,137,680 A | * | 10/2000 | Kodaira et al. | 361/697 |
| 6,313,399 B1 | * | 11/2001 | Suntio et al. | 174/17 VA |
| 6,333,852 B1 | * | 12/2001 | Lin | 361/697 |
| 6,643,129 B2 | * | 11/2003 | Fujiwara | 361/679.47 |
| 6,778,390 B2 | * | 8/2004 | Michael | 361/695 |
| 7,117,928 B2 | * | 10/2006 | Chen | 165/80.3 |

* cited by examiner

*Primary Examiner*—Michael V Datskovskiy
(74) *Attorney, Agent, or Firm*—Leong C. Lei

(57) ABSTRACT

A heat dissipation device is provided for dissipating heat from a heat source inside a notebook computer, and includes a hood, a bottom board, a thermal insulation layer, and at least one fan. The hood and the bottom board together define a heat dissipation channel. The bottom board integrally forms a plurality of fins and pegs. The bottom board is set above the heat source. The fan is set above the bottom board to efficiently expel heat from the inside to the outside. With the plurality of fins and pegs, the heat dissipation surface area of the bottom board and the heat source is increased and the overall heat dissipation performance is enhanced.

10 Claims, 5 Drawing Sheets

HEAT DISSIPATION DEVICE OF NOTEBOOK COMPUTER

TECHNICAL FIELD OF THE INVENTION

The present invention generally relates to a heat dissipation device of a notebook computer, and particularly to a heat dissipation device that is provided for a notebook computer and is arranged on a heat source of the notebook computer for enhancing heat dissipation.

DESCRIPTION OF THE PRIOR ART

With the development of electronic/information devices, notebook computers are getting popular nowadays. Due to the elevated requirement in respect of the operation speed, heat dissipation performance, and compactness of a notebook computer by the consumers, the heat dissipation performance of a notebook computer is now of vital importance. For regular notebook computers, one of the heat sources is a chipset. The notebook computer chipsets include a central processing unit (CPU), a northbridge chipset, and a southbridge chipset. Thus, effectively removing the heat generated by the above discussed heat sources in order to improve the heat dissipation performance of the notebook computer is a key factor for improving overall quality of the notebook computers.

One of the commonly seen heat dissipation devices for notebook computers comprises two solid copper-made heat conducting pipes serving as components for heat conducting and absorbing. The heat conducting pipes are respectively provided with a plurality of metal coupling pieces and the coupling pieces are used for coupling with the heat sources (such as chipset) of a circuit board that generates heat. One end of the heat conducting pipes is soldered to a plurality of fins and a fan is set beside the fins so that an opening of the fan blows air toward to the fins. Thus, when the heat generated by the chipset is conducted through the heat conducting pipes through to the fins located at the opposite end, the heat will be expelled out of the notebook computer by the airflows induced by the fan.

Another known heat dissipation device comprises two solid copper-made heat conducting pipes serving as components for conducting and absorbing heat. A large-sized elongate coupling plate is provided to the heat conducting pipes by forming a slot in the coupling plate that receives the heat conducting pipe(s). The coupling plate also forms a plurality of pegs. An end of the heat conducting pipes is soldered to two sets of fins and a fan is set beside the coupling plate. The fan has two apertures respectively for blowing airflows toward the two sets of fins in order to provide improved heat dissipation performance.

However, both known heat dissipation devices suffer certain drawbacks, such as:

(1) The known techniques use a plurality of copper-made solid heat conducting pipes to serve as a heat dissipation structure, which increases the costs.

(2) Using the copper-made solid heat conducting pipes to transfer heat cannot provide an efficient conduct of heat, leading to decreased efficiency of heat dissipation.

(3) The copper-made heat conducting pipe, which is solid, may easily accumulate heat therein and is incapable to properly expel the heat, so that the solid, copper-made heat conducting pipe is maintained in high temperature for a long term, making it impossible to effectively remove heat from the pegs.

(4) The known copper-made heat conducting pipe has to work with a fan disposed next thereto so that it can only be configured as an L-shape, which occupies a large amount of installation space.

SUMMARY OF THE INVENTION

An objective of the present invention is to provide a heat dissipation device for a notebook computer in order to enhance heat dissipation result and reduce the manufacturing costs.

As compared to the known techniques, the present invention combines a hood and a bottom board to form a heat dissipation channel. The bottom board forms a plurality of fins and pegs to increase the heat dissipation surface area. The bottom board is provided with at least one fan to sequentially and smoothly expel heat generated by heat sources through the heat dissipation channel in order to replace the conventional copper-made heat conducting pipes. Thus, the present invention can realize efficient heat dissipation and reduction of costs.

The foregoing objective and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
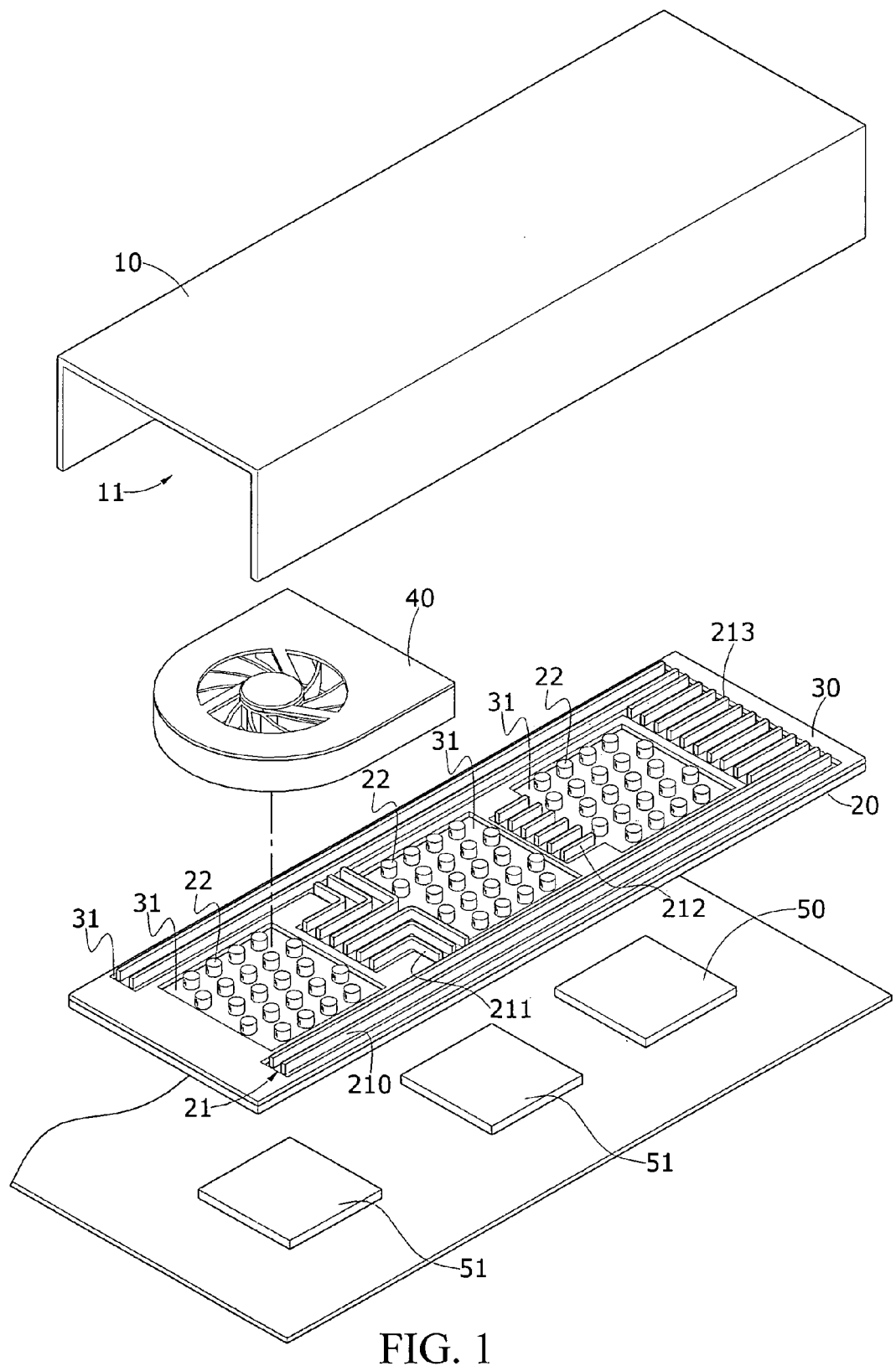
FIG. 1 is an exploded view of an embodiment in accordance with the present invention.
Figure 2:
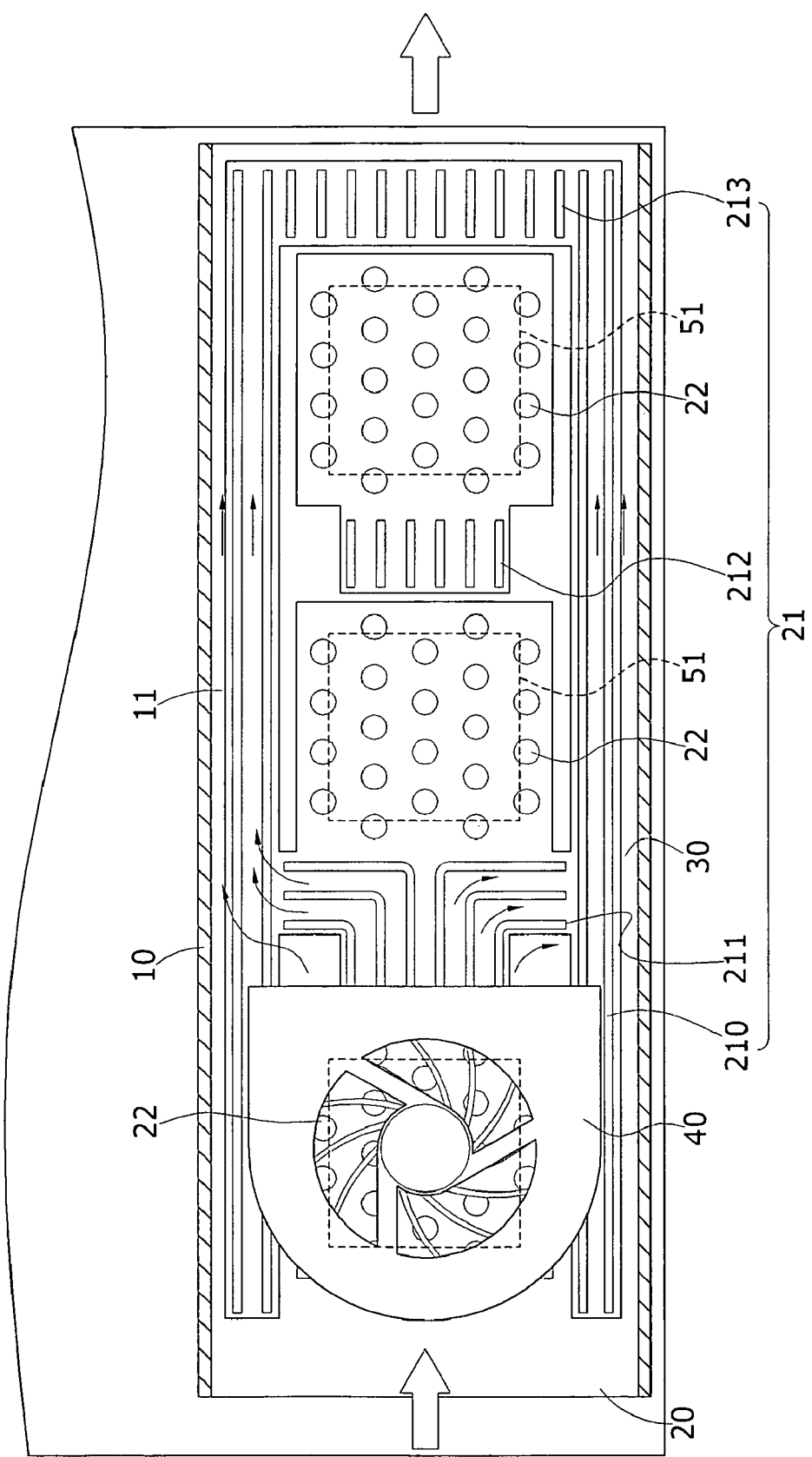
FIG. 2 is a top plan view, in a cross-sectional form, of the embodiment of the present invention.
Figure 3:
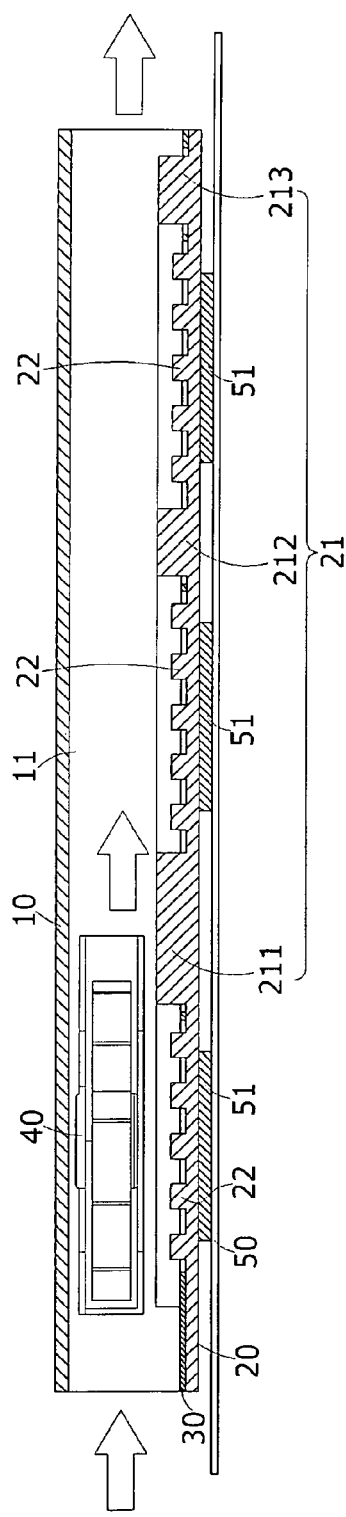
FIG. 3 is a side elevational view, in a cross-sectional form, of the embodiment of the present invention.

With reference to FIGS. 1-3, a heat dissipation device constructed in accordance with an embodiment of the present invention, which is applied to heat sources inside a notebook computer, comprises a hood 10, a bottom board 20 opposite to the hood 10, a thermal insulation layer 30 mounted atop the bottom board 20, and at least one fan 40. It is noted that the present invention is described with reference to a heat source such as a chipset to demonstrate heat dissipation therefrom, but the present invention is not limited to such an application and can also be applied to remove heat from a random access memory or other heat sources for example.

The hood 10 forms a receiving space having a downward-facing opening and in the embodiment illustrated, the hood 10 is made an elongate hood, but is not limited thereto and can be of other configurations in other feasible applications.

The bottom board 20 is set opposite to and attached below the hood 10 and forms a heat dissipation channel 11 jointly between the hood 10 and the bottom board 20. The bottom board 20 possess fins 21 and pegs 22. The bottom board 22 arranges a plurality of pegs 22 at locations corresponding to chipsets 51 on a circuit board 50 and also sets a plurality of fins 21 respectively on opposite sides of the bottom board 20 and among the pegs 22. The plurality of fins 21 includes multiple long fins 210 and multiple short fins 211, 212, 213. The long fins 210 are on the two sides of the bottom board 20 to dissipate heat from higher temperature sources through the two sides without passing through the pegs 22. Further, the plurality of short fins 211, 212, 213 are arranged between the pegs 22 and at one or more end portions of the bottom board 20 for directly receiving heat from a central portion of the chipset 51 and to guide the heat to the heat dissipation channel 11 and dispatch the heat outside.

It is noted that, in other embodiments, besides being of the same height for the plurality of fins 21 formed on the bottom board 20, the fins 21 corresponding to a central portion of the chipset 51 can be made shorter than the fins 21 that are located corresponding to opposite side portions of the chipset 51, or alternatively, the fins 21 corresponding to the central portion of the chipset 51 are made higher than the fins 21 that are located corresponding to the opposite side portions of the chipset 51. In other words, the plurality of the fins 21 include the fins 21 that are located on the two side portions of the bottom board 20 and the fins 21 located at a central portion of the bottom board 20 and further, the number and the height of the fins 21 are not limited to the above described and can be understood and practiced by those having ordinary skills in the art.

Further, in the embodiment illustrated, the heat sources are a plurality of chipsets 51 (three chipsets 51 being shown in the drawings). However, this is only illustrative, and not limitative.

In the embodiment illustrated, the plurality of fines 21 and the pegs 22 are integrally formed with the bottom board 20. The plurality of fins 21 can form a linear arrangement; and the plurality of pegs 22 is arranged in a matrix form and can function as turbulence inducing pegs, but is not limited thereto and can be any desired arrangement provided that the bottom board 20 arranges the plurality of pegs corresponding to the heat sources (the chipsets 51) and sets the plurality of fins 21 beside the plurality of pegs 22. Further, the hood 10 and the bottom board 20 can be an aluminum hood and an aluminum board opposite to each other, or an aluminum alloy hood and an aluminum alloy board opposite to each other, or other hoods and bottom boards that are light-weighted and possess cost effective.

The thermal insulation layer 30 is laid on a top face of the bottom board 20 and forms apertures 31 corresponding to the plurality of fins 21 and the plurality of pegs 22. In the embodiment illustrated, the thermal insulation layer 30 is a thermal insulation layer made of a high thermal transmission resistance material (having a low thermal conductivity), such as a polyimide layer, a silicon-aluminum fiber layer, or other equivalent film of high thermal resistance and low thermal conductivity, which allows thermal energy from below the bottom board 20 transmit directly through the plurality of fins 21 and the pegs 22 to the heat dissipation channel 11 between the hood 10 and the bottom board 20 and prevents thermal energy transmitting back to the bottom board 20 reversely to dispatch thermal energy thoroughly.

The fan 40 is set above the plurality of pegs 22 and in the embodiment illustrated, the fan 40 is set above the pegs 22 that are located above the chipset 51 to guide heat upwards and sequentially conducts the heat through the plurality of fins 21 on the two sides and the central portion to the heat dissipation channel 11 for removal of the heat out of the pegs 22. In other words, the fan 40 is set to directly face the heat source.

Figure 4:
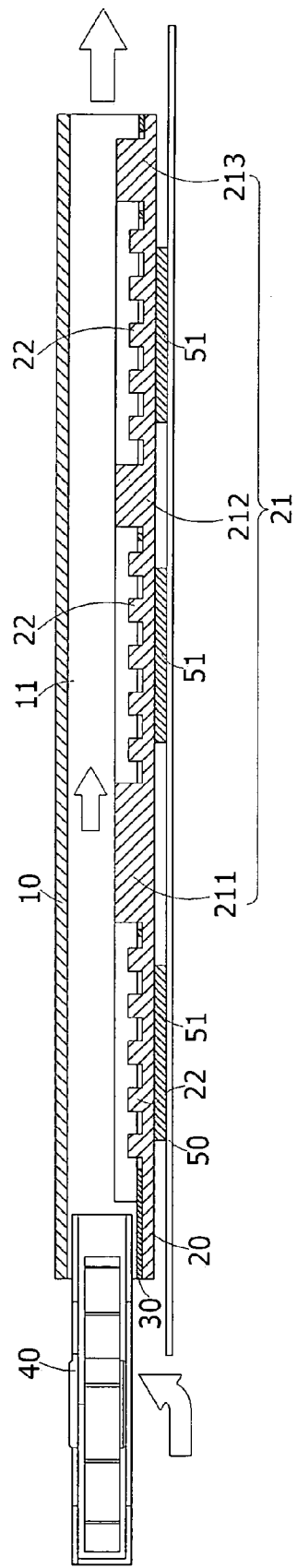
FIG. 4 is a side elevational view, in a cross-sectional form, illustrating internal arrangement of a fan.

Referring to FIG. 4, to reduce the overall height of a computer, the fan 40 can be arranged beside the plurality of pegs 22 so that the fan 40 can directly blow heat into the heat dissipation channel 11, whereby the heat on the plurality of fins 21 and the plurality of pegs 22 can be directly blown into the heat dissipation channel 11 for efficient removal.

Figure 5:
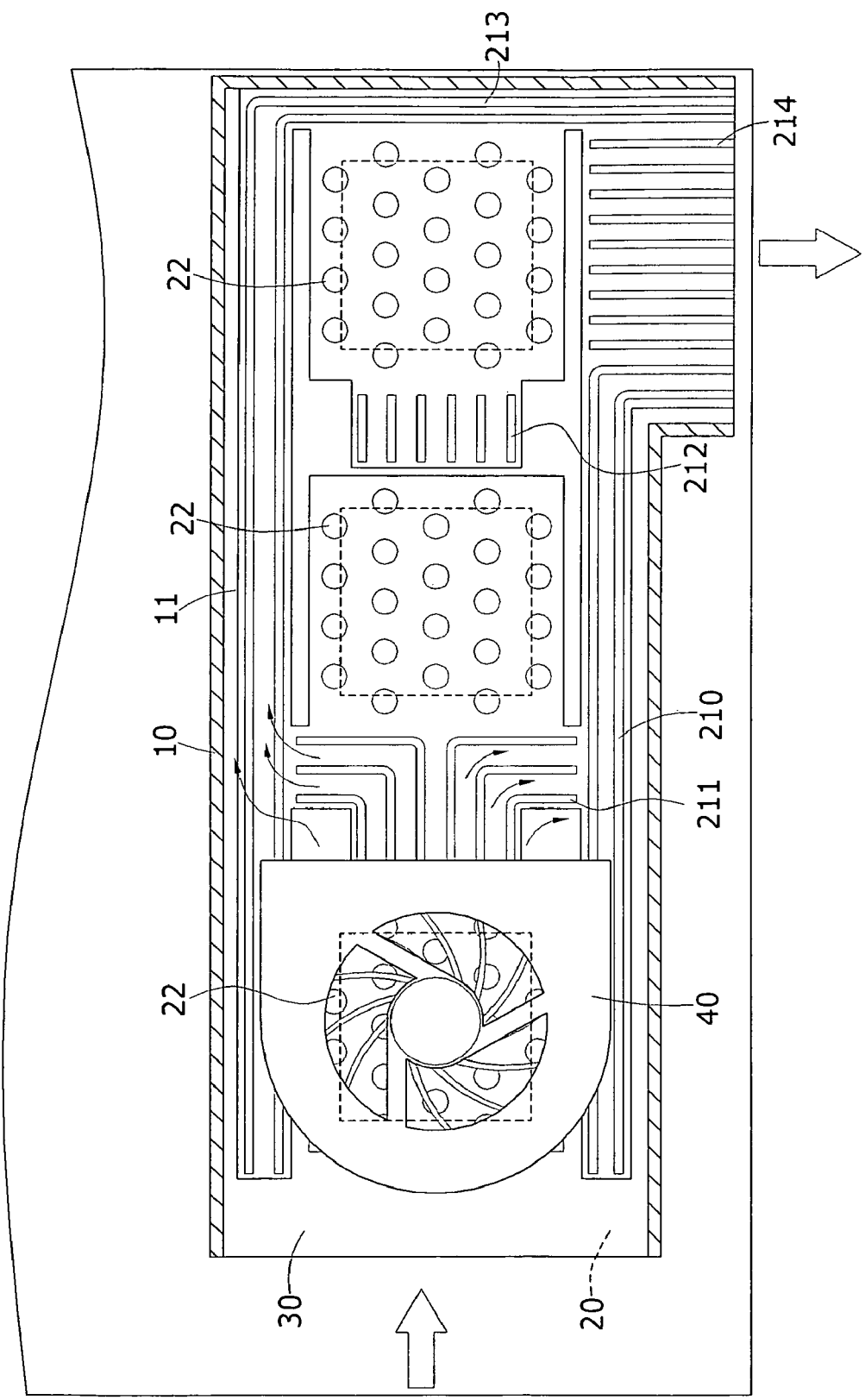
FIG. 5 is a top plan view, in a cross-sectional form, illustrating another embodiment in accordance with the present invention.
Figure 6:
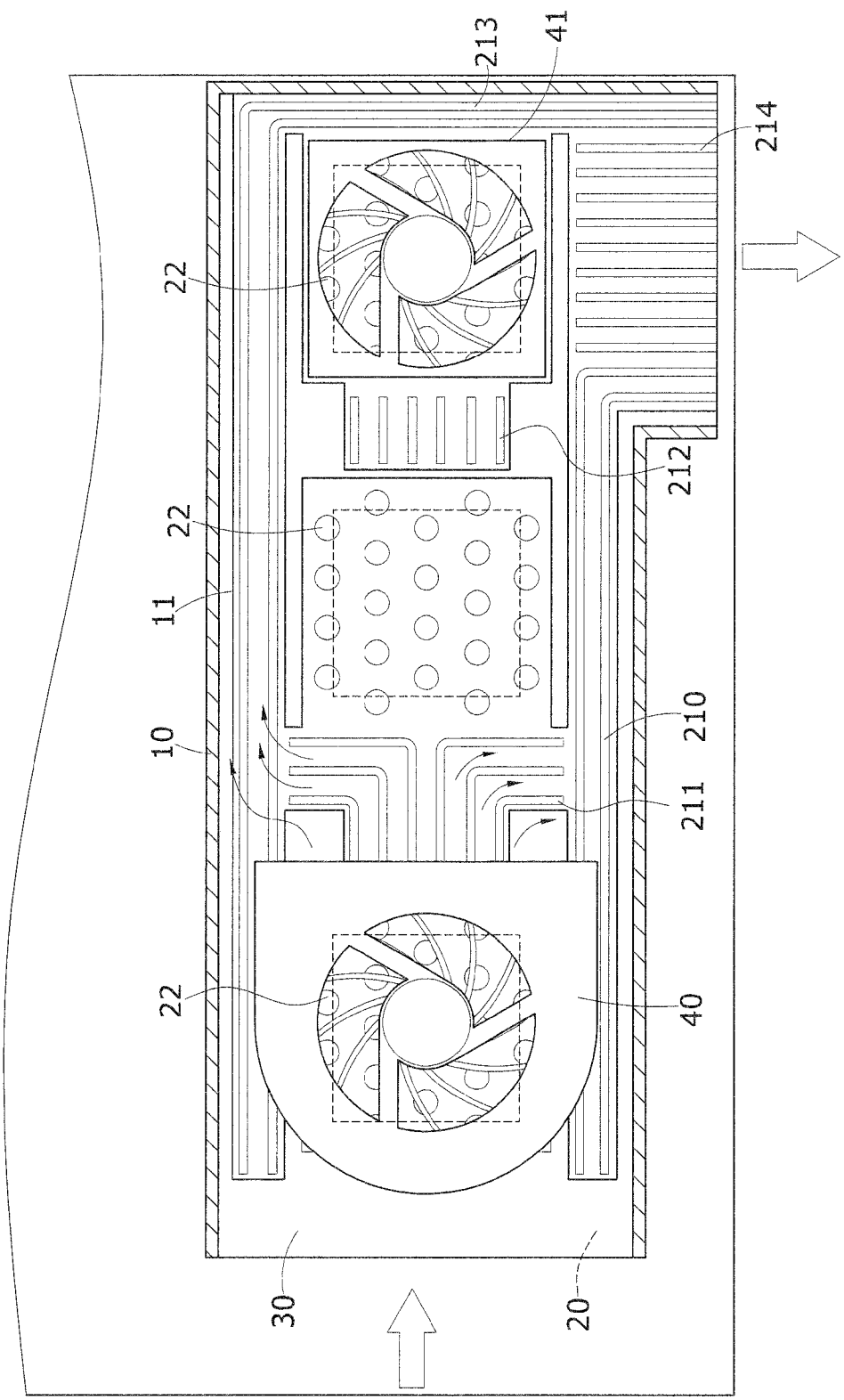
FIG. 6 is a top plan view, in a cross-sectional form, illustrating a further embodiment in accordance with the present invention.

Referring to FIG. 5, the hood 10 and the bottom board 20 can be made a bent or angled or crooked hood and a correspondingly crooked or angled bottom board. A bent section of the bottom board 20 is further provided with a plurality of short fins 214 to provide split flow and thus enhance the heat dissipation performance. An additional fan (see FIG. 6) can be provided at such a bent section to provide an arrangement of setting one heat suction fan and one heat expulsion fan at the two ends of the heat dissipation channel 11, whereby the heat drawn in by the heat suction fan is transmitted through the heat dissipation channel 11 to the heat expulsion fan at the opposite end for efficient expulsion of the heat to the outside. In other words, the fan 40 can be set to directly face the heat source and locations remote from the heat source can also be provided with fan 41. Further, the fans can be used to draw in heat, and the fans can also function to draw low temperature fresh air into the heat dissipation channel 11. The location and number of the fans are not limited to what described above.

Thus, the present invention offers the following advantages:

(1) The present invention uses a plurality of fins and a plurality of pegs to increase the heat dissipation surface area of the heat dissipation device and chipsets and further incorporates a design of heat dissipation channel to realize complete and efficient removal of total heat from the inside to the outside for replacing the conventional copper-made heat conducting pipes, and to enhance heat dissipation performance.

(2) The present invention provides a bottom board that is covered with a thermal insulation layer, which forms apertures corresponding to the fins and pegs, so that heat generated below the bottom board can be directly transmitted through the fins and the pegs to the heat dissipation channel defined between the hood and bottom board and the heat is not allowed to transmit reversely to the bottom board, whereby the heat can be completely guided to the heat dissipation for efficient outward expulsion and thereby enhancing the performance of heat dissipation.

(3) The present invention provides a hood and a bottom board that are respectively aluminum hood and aluminum bottom board or aluminum alloy hood and aluminum alloy bottom board, which are of reduced weights and lower the manufacturing costs thereof.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A heat dissipation device, which is applicable to dissipate heat from a heat source inside a notebook computer, comprising:
    a hood forming an internal receiving space;
    a bottom board, which arranges a plurality of pegs and a plurality of fins beside the plurality of pegs at locations corresponding the heat source, the bottom board being positioned above the heat source and being mounted to and covering an open bottom of the hood so that the hood and the bottom board together defines a heat dissipation channel;
    a thermal insulation layer set on a top face of the bottom board forming apertures corresponding to the plurality of fins and the plurality of pegs; and
    at least one fan set above the bottom board and is located close to the heat dissipation channel.

2. The heat dissipation device according to claim 1, wherein the hood is an elongate hood and the bottom board is shaped corresponding thereto.

3. The heat dissipation device according to claim 1, wherein the hood is a crooked hood and the bottom board is crook-shaped corresponding thereto.

4. The heat dissipation device according to claim 1, wherein the hood and the bottom board are respectively an aluminum hood and an aluminum bottom board.

5. The heat dissipation device according to claim 1, wherein the plurality of fins and the plurality of pegs are integrally formed with the bottom board.

6. The heat dissipation device according to claim 1, wherein the fins comprise long fins arranged on opposite side portions of the bottom board and short fins arranged between the plurality of pegs.

7. The heat dissipation device according to claim 1, wherein the fan is set above the plurality of pegs.

8. The heat dissipation device according to claim 1, wherein the fan is set outside the plurality of pegs and exposed outside the heat dissipation channel.

9. The heat dissipation device according to claim 1, wherein two fans are respectively set at opposite ends of the heat dissipation channel.

10. The heat dissipation device according to claim 1, wherein the plurality of fins comprises fins arranged at opposite side portions of the bottom board and fins arranged at a central portion of the bottom board, and wherein the fins arranged at the opposite side portions of the bottom board are of a height greater than that of the fins arranged on the central portion of the bottom board.

* * * * *